May 4, 1943.　　　　B. C. PLACE　　　　2,318,182
FASTENER
Filed Oct. 20, 1938　　　2 Sheets-Sheet 2
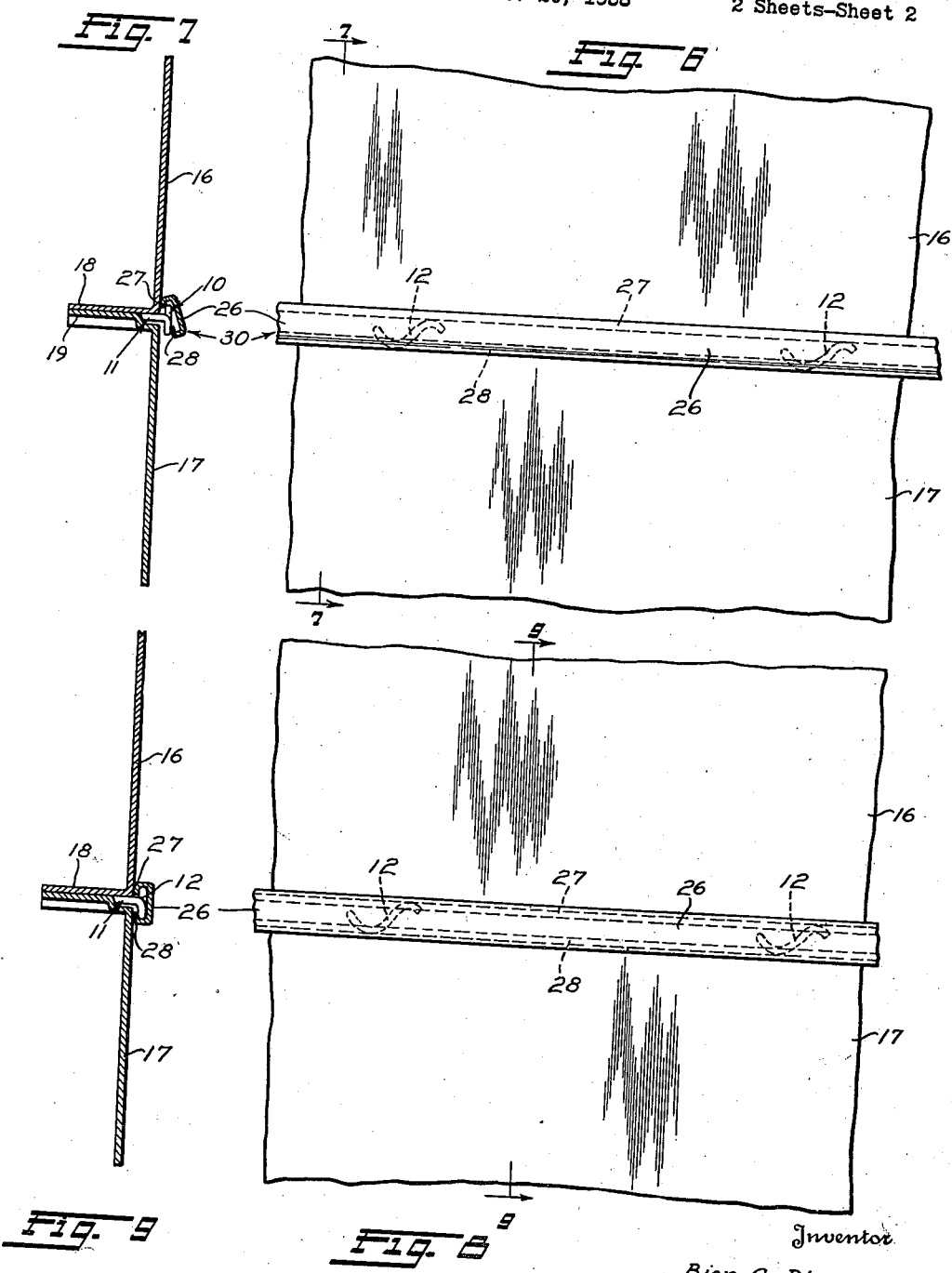
Inventor
Bion C. Place
By　Strauch & Hoffman
Attorney Patented May 4, 1943

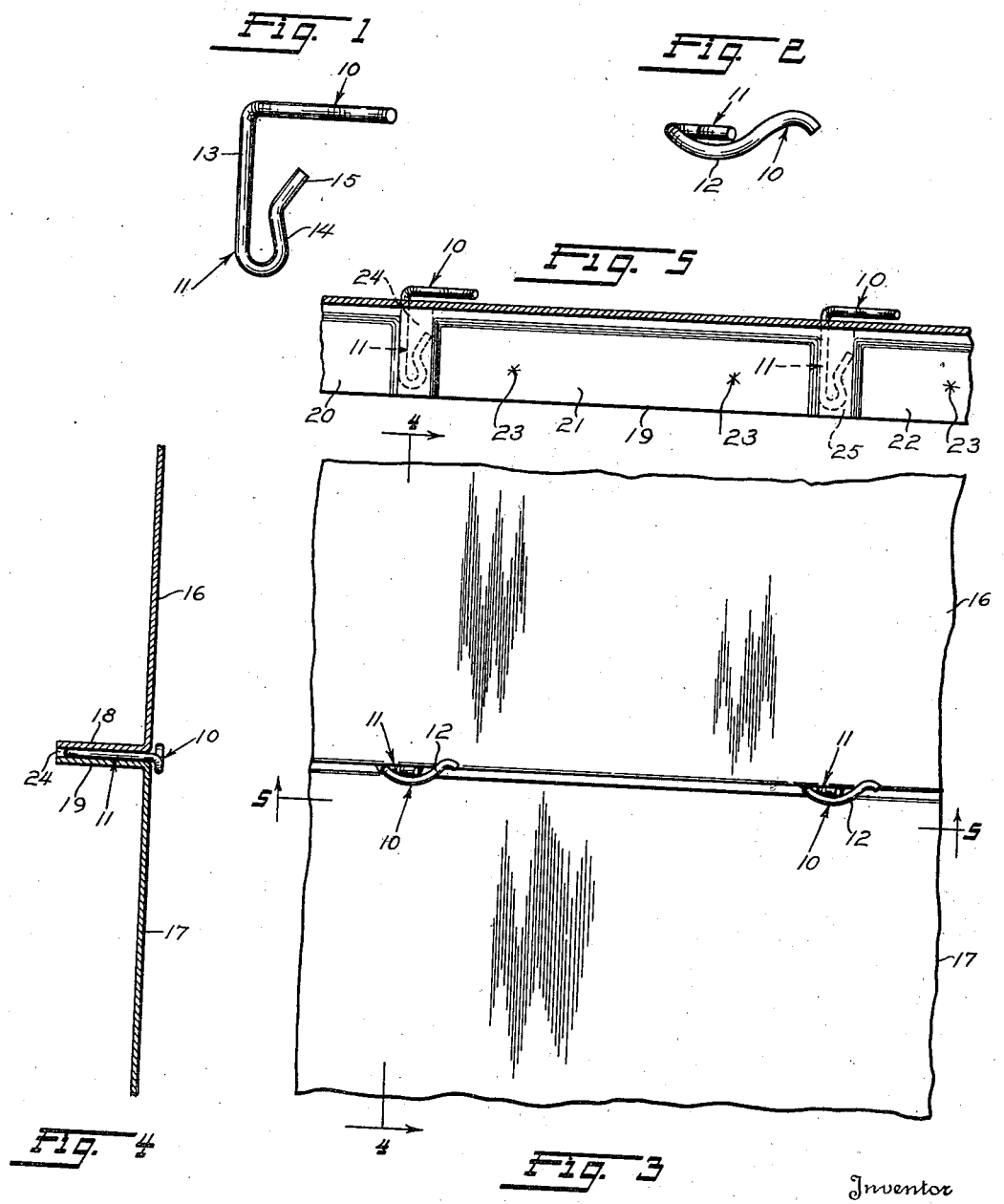

2,318,182

UNITED STATES PATENT OFFICE 2,318,182

FASTENER

Bion C. Place, Detroit, Mich., assignor of one-half to George E. Gagnier, Detroit, Mich.

Application October 20, 1938, Serial No. 236,079

5 Claims. (Cl. 189—88)

This invention relates to an improved spring stud fastener designed to permit a hollow flanged molding to be easily and efficiently snapped on the head of the fastener after its shank has been detachably engaged in a socket or opening in the structure to which the molding is to be applied. More particularly, the invention is concerned with a wire stud fastener having a shank shaped to provide a non-rotative engagement with the structure to which the molding is to be applied and a head in the form of a spring arm subject to torsion upon engagement of the molding with the head of the fastener in order to insure satisfactory engagement between the molding and the fastener.

Hollow moldings having inturned flanges are widely used in finishing metal structures and in concealing joints between parts of such structures. In many metal structures, such as refrigerators, stoves or the like, the interior of the structure is relatively inaccessible for the application of or the manipulation of fastening devices that necessitate access thereto when such fasteners are used for the securing of moldings to the exterior of the structure. Yet fasteners requiring manipulation or application of a part of the fastener from the interior of the structure are extensively used resulting in greatly increased cost of production.

The primary purpose of the present invention is to provide a fastener capable of being fixedly secured to the structure to which the molding is to be applied from the exterior of said structure, and at the same time so constructed that the molding may be interlocked with the fastener after it has been first assembled with respect to said structure in a manner insuring a firm and satisfactory engagement between the molding flanges and the fastener.

A still further object of the invention is to provide an improved wire spring stud fastener, the stud or shank part of which is constructed so that it may be forced or driven into a joint or a socket in a metal structure with the facility with which a nail is driven in a wooden structure, and which fastener possesses holding power comparable to that provided by a nail or tack driven in wood.

A still further object of the invention is to provide a spring stud fastener the head part of which consists simply of a curved arm united to the shank of the fastener at one end and having its other end free, the overall width of the head of the fastener measured transversely of said curved arm exceeding slightly the internal width of the molding for which it is designed whereby a distortion of the arm constituting the head of the fastener is necessary to bring about an interlocking engagement between said arm and the molding, such distortion insuring a firm, unyielding engagement between the head of the fastener and the molding.

This invention also aims to provide an improved combination of structure for a molding and fastener permitting application of the fastener to the structure from the exterior thereof after the latter has been engaged with said structure, the arrangement permitting removal and replacement of the fasteners and molding when necessary from the exterior of said structure.

Still another object of the invention is to provide an improved method of bringing about an interlock between a hollow flanged molding and a multiplicity of fasteners, the heads of which constitute bent or curved arms.

Still further objects of the invention will appear as the description thereof proceeds with reference to the accompanying drawings in which:

Figures 1 and 2 are respectively side elevation and end views of the improved spring fastener constituting an important part of the present invention.

Figure 3 is a fragmentary elevational view showing several of the fasteners of Figures 1 and 2 applied to a structure and in a position ready to have a molding engaged therewith.

Figures 4 and 5 are respectively sectional views taken by the planes indicated by the lines 4—4 and 5—5 in Figure 3.

Figure 6 is a fragmentary elevational view showing a hollow flanged molding ready to be engaged with the fasteners.

Figure 7 is a sectional view taken on the plane indicated by the line 7—7 in Figure 6 looking in the direction of the arrows.

Figure 8 is a fragmentary elevational view showing a molding in final position on the structure to which it is applied.

Figure 9 is a sectional view taken on the plane indicated by the line 9—9 in Figure 8 looking in the direction of the arrows.

Like reference characters indicate like parts throughout the several figures.

The fastener of the present invention, illustrated in Figures 1 and 2, comprises a head 10 and a shank or stud part 11, the head being formed from one end of a single piece of spring tempered wire, while the shank or stud part is formed from the other end thereof. The head 10 consists simply of a bent elongated arm 12. Preferably the arm 12 is sinuously bent or curved as illustrated. The width of the head measured transversely to the length of the arm exceeds the internal width of the hollow molding for which the fastener is designed for the purpose hereinafter stated.

The shank 11 of the fastener consists of a straight portion 13 and a rebent portion 14 forming with the portion 13 a U-like end for the shank. The shank also includes a portion 15 turned outwardly away from the straight portion 13 as illustrated, said portion 15 providing a tongue which is relatively sharp because it is formed from one of the wire ends of which the fastener is constructed, said tongue serving the purpose presently to be referred to.

Preferably the head 10 is disposed in a plane normal to the straight portion 13 of the shank and the arm 12 constituting the head overlies the portions 14 and 15 of the shank. It should be understood, however, that the head may be related to the shank otherwise than as illustrated when the nature of the structure and the molding with which the fastener is used necessitate this.

The fastener just described is intended to secure a molding to such a structure as is illustrated in Figures 3, 4 and 5 by way of example, the latter figures illustrating a fragment of a metallic refrigerator constructed of a number of metallic flanged plate-like members secured together at joints or seams which are to be concealed by a molding of conventional form. In the illustrated embodiment of the invention the plate-like members or panels 16 and 17 are provided with inwardly bent flanges 18 and 19, respectively. The flange 18 is preferably straight. The flange 19, however, has portions 20, 21 and 22 embossed or dished outwardly, said portions being attached to the flange 18 as by spot welds at 23 or in any other equivalent manner. The embossment or dishing of the flange 19 at spaced portions thereof provides sockets or openings 24 and 25 between the adjacent flanges and serves to space the body of the sheet 16 from 17 adjacent the outer surface thereof as illustrated, said space presenting a joint that is to be covered by a hollow flanged molding presently to be referred to.

The manner of securing the adjacent sheet metal panels or plates of the structure together, which has just been described, has been selected merely by way of example, such structure being at present used in the construction of metallic refrigerator bodies. Any equivalent construction providing sockets or openings for the fasteners may be employed instead of that specifically described.

In order to prepare the metal structure for the attachment thereto of the hollow flanged molding, fasteners such as that illustrated in Figures 1 and 2 are first applied to the structure by inserting the shanks 11 in the openings or sockets 24 and 25. The width of said openings or sockets is less than the width of the shank of the fastener measured transversely thereof so that it is necessary to contract the U-like portion at the end of the shank in forcing said shank into the opening or socket. The fastener shanks may be forced into the openings or sockets with the same facility which characterizes the driving of a nail into wood, and after they have been forced in said openings or sockets the tooth provided on each shank by each shank at the end of the portion 15 bears with considerable pressure against the wall of the socket, thus maintaining the fastener in position in the socket. If necessary, however, the fastener can be withdrawn by exerting sufficient pull on the shank of the fastener. Its hold, however, is comparable to that of a nail or like fastener driven in wood.

When the shanks of the fasteners have been driven into the openings or sockets, the arms 12 of the fasteners overlie the joint between the plate-like members 16 and 17 as illustrated in Figure 3, while the shank of the fastener is non-rotatable in the socket in which it has been inserted. Sufficient fasteners are supplied to the structure to engage the length of molding to be applied thereto at properly spaced intervals. The fasteners are all arranged so that the arms extend in the same direction and so that the free ends thereof are at the same side of the joint. The structure is then ready to have the molding attached thereto.

The moldings, used to conceal joints such as that provided between the plate-like members 16 and 17, customarily include a body 26 which may be plain or ornamented as desired, and inturned flanges 27 and 28 spaced inwardly of the body 26. In applying the molding to the fasteners already secured to the structure, the flange 27 is first engaged beneath the free ends of the aligned arms of the fastener, and pressure is exerted against the edge of the molding in the direction indicated by the arrow 29 in Figure 6, the molding being slightly tilted as illustrated in Figure 7. Pressure is then exerted against the edge of the molding bending the arms 12 until the edge of the flange 28 has reached a position clearing the opposite edge of each of said arms, said position being likewise shown in Figure 7. Pressure is then exerted against the molding in the direction indicated by the arrow 30 in Figure 7 until the flange 28 is brought beneath the arm 12, the arms distorted during the application of the molding then returning toward their original condition and thus entering between the flanges in the body of the fastener and engaging opposite walls of the molding with a firm yielding pressure which holds the molding from shifting with respect to the fasteners and in a satisfactory manner against the structure, inasmuch as the shank of the fastener is put under some tension by the wedging of the flanges 27 and 28 between the arms constituting the heads.

The final position of the molding is illustrated in Figures 8 and 9 of the drawings in which the flange 28 as well as the flange 27 is beneath the head 12, and in which said head extends from one side of the molding firmly against the opposite side.

While the molding is firmly secured to the structure and conceals the joint between adjacent panels or sheets thereof it will be understood that the molding can be removed from the exterior of the refrigerator or the like by reversing the operations just described without removing the spring fasteners from the structure. This enables damaged moldings to be readily replaced, and if it should be necessary to replace any of the fasteners it will be understood that this can likewise be done from the exterior of the refrigerator. There is, accordingly, no necessity for performing any operation necessitating access to the interior of the structure in applying or removing moldings when fasteners such as just described are utilized.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a structure including plates having flanges joined together so as to provide non-circular fastener receiving sockets at the joint between said plates, spring wire fasteners having U-shaped shanks engaged in said sockets from the unflanged side of said plates, a resilient arm extending laterally from one leg of the U-shape of each shank over the joint between said plates and a hollow molding having inturned flanges engaged beneath said arms.

2. In combination, a structure having non-circular fastener receiving openings, fasteners having non-circular shanks sprung in said openings, resilient sinuously curved arms carried by said shanks and extending laterally thereof in spaced relation to said structure, said arms being arranged in approximate endwise alignment and a hollow flanged molding hooked on said arms and then sprung into engagement therewith so that each of said sinuously curved arms extends from one side of the interior of the molding to the opposite side thereof and so that said flanges are clamped between said arms and said structure.

3. A one-piece wire stud fastener comprising a head portion consisting in a sinuously bent end of a piece of wire and a shank portion consisting of a single leg depending from one end of the head portion, said leg being return-bent toward said head portion and then deflected laterally of the return-bent portion in a direction away from said leg to provide a tooth-like projection.

4. A wire stud fastener comprising a head consisting of a sinuously curved arm and a shank of U-shaped formation depending from one end of said arm, one leg of the U-shape being longer than the other and carrying the fastener head and the shorter leg having a free end deflected laterally of said shorter leg in a direction away from said longer leg to provide a tooth for engagement with a socket wall to retain the shank therein.

5. A structure ready for the reception of a hollow molding, including a multiplicity of fastener non-circular sockets, a multiplicity of fasteners having portions non-rotatively engaged in said sockets respectively, said fasteners each having a resilient sinuously curved arm resiliently connected to one of said portions at one end and free of said structure at the other end, said arms being arranged so that they are approximately aligned endwise so as to permit the molding to be hooked on said arms from one side and then rocked into snapped engagement with the other side of said arms.

BION C. PLACE.